United States Patent
Buchacz et al.

(10) Patent No.: US 11,001,294 B2
(45) Date of Patent: May 11, 2021

(54) STEERING COLUMN POWER ASSIST ASSEMBLY HOUSING

(71) Applicant: Nexteer Automotive Poland Sp. z o.o., Tychy (PL)

(72) Inventors: Andrzej W. Buchacz, Gliwice (PL); Andrzej Baier, Silesia (PL); Krzysztof Z. Herbuś, Silesia (PL); Piotr G. Ociepka, Silesia (PL); Łukasz M. Grabowski, Silesia (PL); Michal Sobek, Mikolow (PL); Jacek Wyjadlowski, Bedzin (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 40 days.

(21) Appl. No.: 15/684,338

(22) Filed: Aug. 23, 2017

(65) Prior Publication Data

US 2019/0061805 A1    Feb. 28, 2019

(51) Int. Cl.
| | | |
|---|---|---|
| *B62D 5/04* | (2006.01) | |
| *F16H 57/039* | (2012.01) | |
| *F16H 57/021* | (2012.01) | |
| *F16H 57/032* | (2012.01) | |
| *F16H 57/02* | (2012.01) | |

(52) U.S. Cl.
CPC ......... *B62D 5/0403* (2013.01); *B62D 5/0409* (2013.01); *F16H 57/039* (2013.01); *F16H 2057/0213* (2013.01); *F16H 2057/02017* (2013.01); *F16H 2057/0325* (2013.01)

(58) Field of Classification Search
CPC ... B62D 3/02; B62D 3/04; B62D 3/12; B62D 5/0403; B62D 5/20; B62D 5/22; B62D 5/24; F16H 2057/0325; F16H 2057/02017; F16H 2057/0213; F16H 57/039

See application file for complete search history.

(56) References Cited

U.S. PATENT DOCUMENTS

| | | | | |
|---|---|---|---|---|
| 4,020,715 | A * | 5/1977 | Sollars | F16H 1/16 74/606 R |
| 5,341,701 | A * | 8/1994 | Krom | B62D 3/08 74/440 |
| 5,360,329 | A * | 11/1994 | Lemelson | F28F 19/02 425/143 |
| 5,738,183 | A | 4/1998 | Nakajima et al. | |
| 7,140,268 | B2 * | 11/2006 | Leposky | B60K 17/344 74/424 |
| 8,627,745 | B2 * | 1/2014 | Uchimura | E05F 15/697 74/606 R |
| 2002/0179361 | A1 | 12/2002 | Ross | |
| 2006/0181161 | A1 * | 8/2006 | Kawamoto | H02K 7/1166 310/51 |
| 2008/0041342 | A1 * | 2/2008 | Kochanowski | F02M 61/16 123/456 |

(Continued)

OTHER PUBLICATIONS

Office Action and Search Report regarding related PL App. No. P. 422 622; dated May 27, 2020.

*Primary Examiner* — Prasad V Gokhale
(74) *Attorney, Agent, or Firm* — Dickinson Wright PLLC

(57) ABSTRACT

A steering column power assist assembly housing includes a worm bearing sleeve, a gear bearing sleeve, and an over-molded portion of the housing formed on the worm bearing sleeve and the gear bearing sleeve.

7 Claims, 4 Drawing Sheets

(56) References Cited

U.S. PATENT DOCUMENTS

| | | | |
|---|---|---|---|
| 2011/0175465 A1* | 7/2011 | Huck | F16H 57/039 |
| | | | 310/43 |
| 2012/0272763 A1* | 11/2012 | Murakami | F16H 57/039 |
| | | | 74/412 R |
| 2015/0107384 A1* | 4/2015 | Kwon | B62D 3/04 |
| | | | 74/89.14 |
| 2015/0225011 A1* | 8/2015 | Ishii | B62D 5/0403 |
| | | | 180/444 |
| 2017/0182760 A1* | 6/2017 | Stenbeck | B32B 5/02 |
| 2019/0168281 A1* | 6/2019 | Krimmel | F16C 3/02 |

* cited by examiner

STEERING COLUMN POWER ASSIST ASSEMBLY HOUSING

BACKGROUND OF THE INVENTION

The following description relates to vehicle steering columns and, more particularly, to a steering column power assist assembly housing and a method of manufacturing the housing.

Electrically actuated or electrically assisted steering systems provide power assist to a steering assembly. A controller receives an input signal and commands an electric motor to drive a gear arrangement to provide assistance to a user by lessening the input torque required to perform various steering functions. The power assist is provided with a power assist assembly that is typically manufactured with aluminum, or other metal, casting which is then machined to conform to the assembly requirements. The manufacturing process may be tedious and expensive due to the tight tolerances often present. Furthermore, the use of metal causes the assembly to be expensive and high mass.

SUMMARY OF THE INVENTION

According to an embodiment of the disclosure, a steering column power assist assembly housing includes a worm bearing sleeve, a gear bearing sleeve, and an over-molded portion of the housing formed on the worm bearing sleeve and the gear bearing sleeve.

According to another embodiment of the disclosure, a steering column power assist assembly housing manufactured by the process includes forming a worm bearing sleeve. Also included is forming a gear bearing sleeve. Further included is over-molding a remainder of the housing onto the worm bearing sleeve and the gear bearing sleeve.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, power assist assembly is provided for use in vehicle steering columns. The power assist assembly described herein may be employed with various types of steering columns. In particular, electric power steering systems and steer by wire systems are examples of vehicle steering columns that may benefit from the embodiments disclosed herein.

Figure 1:
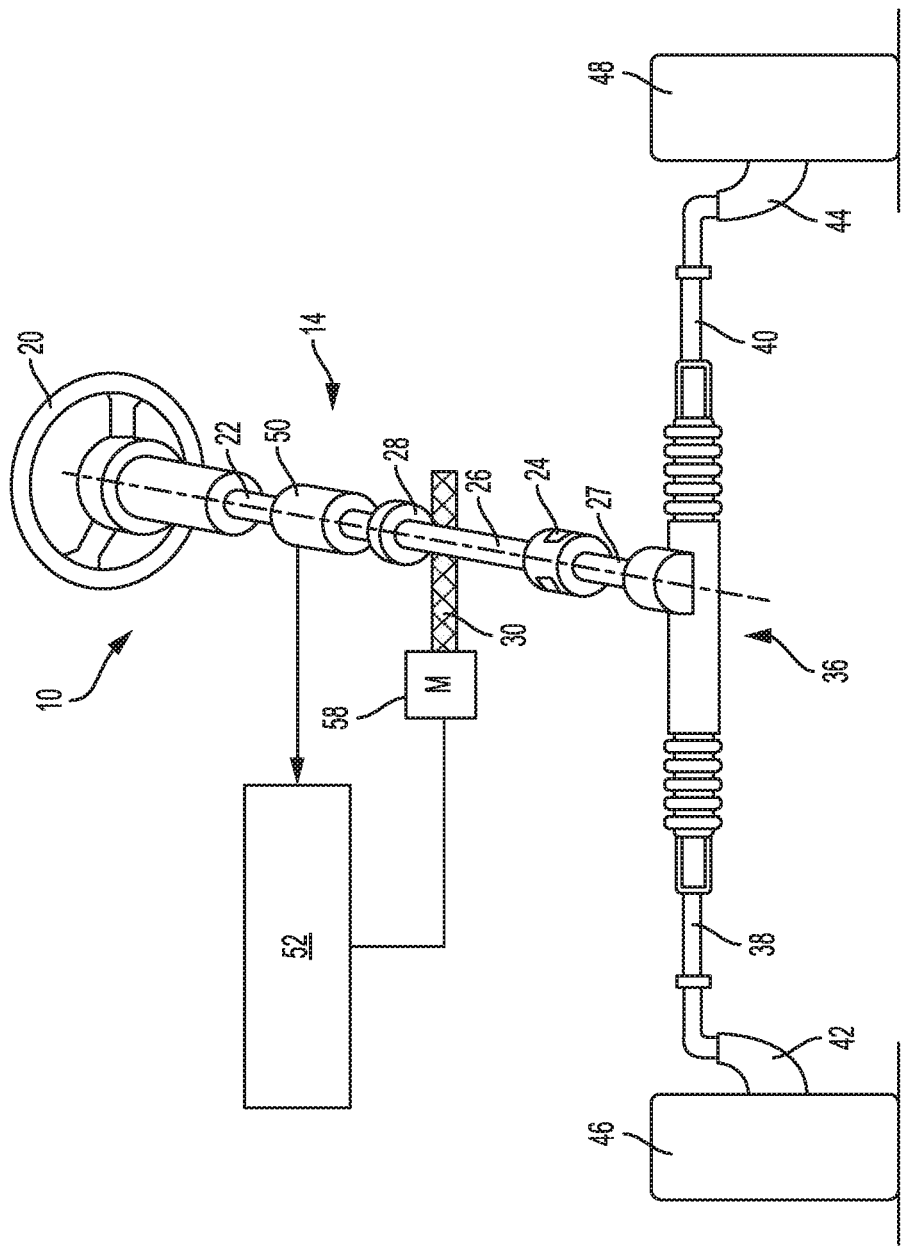
FIG. 1 is a schematic view of a steering system for a vehicle with a power assist assembly.

FIG. 1 illustrates a steering system 10 that is provided to steer a vehicle in a desired direction. The steering system 10 includes a handwheel 20, an upper steering column 22, a universal joint 24, a lower steering column 26, a gear input shaft 27, a gear 28, a gear input component 30, tie rods 38, 40, steering knuckles 42, 44, and road wheels 46, 48.

In some embodiments, the steering system 10 is an electric power steering system that utilizes a rack and pinion steering mechanism 36, which includes a toothed rack (not shown) and a pinion gear (not shown). During operation, as handwheel 20 is turned by a vehicle operator, upper steering column 22 is operatively connected to the gear input shaft 27 and turns the pinion gear. Rotation of the pinion gear moves the toothed rack, which moves tie rods 38, 40. Tie rods 38, 40 in turn move respective steering knuckles 42, 44, which turn the respective road wheels 46, 48. It is to be appreciated that the steering system 10 may include fewer or more shaft or column components. Furthermore, as described above, in some embodiments a physical connection is not provided between the handwheel 20 (or other steering input device) and the gear input shaft 27. Therefore, it is to be understood that the gear that transmits the assist torque is operatively coupled to a steering column component and is not limited to connection to the portion of the column described above or in the manner illustrated.

The steering system 10 may include a control system to assist in controlling the steering system 10. In some embodiments, the control system 14 includes a column torque sensor 50, a controller 52, and a steering assist motor 58. The column torque sensor 50 generates a signal indicative of an amount of torque being applied to the vehicle handwheel 20 and the upper steering column 22 by a vehicle operator. In one embodiment, the torque sensor 50 includes a torsion bar (not shown) which outputs a variable-resistance to the controller 52 based on an amount of twist of the torsion bar. Alternatively, other types of torque sensors known to those skilled in the art could be utilized. The controller 52 generates control signals that control operations of the steering assist motor 58. The controller(s) is electrically coupled to the torque sensor 50. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

The motor 58 is configured to drive the gear input component 30, which is operably coupled to the gear 28 for moving the gear input shaft 27, steering mechanism 36, tie rods 38, 40, and knuckles 42, 44 toward an operational position wherein road wheels 46, 48 have a desired front road wheel angle. In the illustrated embodiment, a worm-gear arrangement is provided, with the gear input component being a worm 30. The worm 30 includes a thread pattern that is in meshed engagement with a set of gear teeth of the gear 28.

Figure 2:
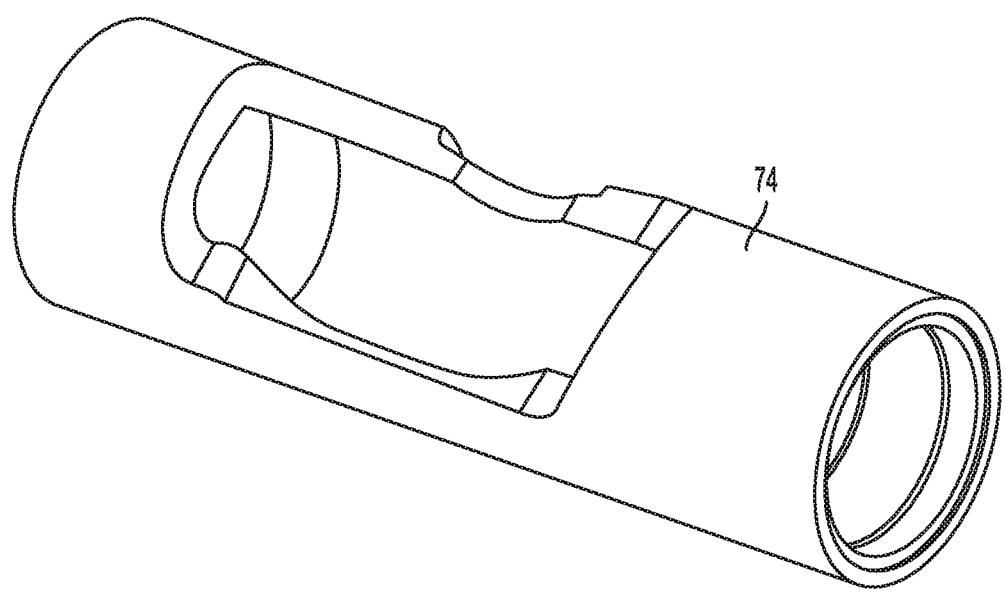
FIG. 2 is a perspective view of a worm sleeve.
Figure 3:
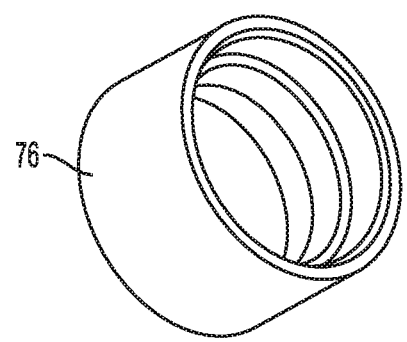
FIG. 3 is a perspective view of a gear bearing sleeve.
Figure 4:
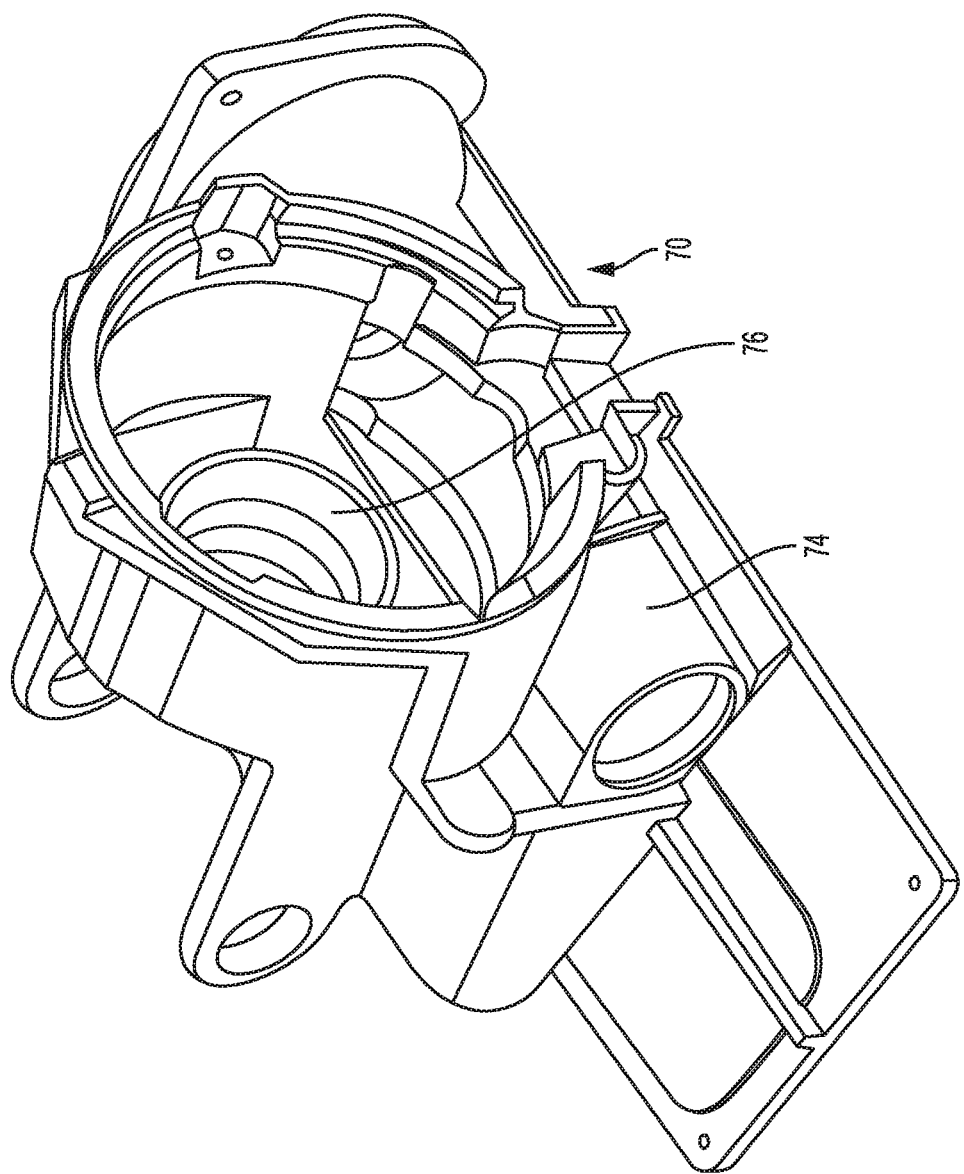
FIG. 4 is a perspective view of a housing of the power assist assembly.

Referring now to FIGS. 2-4, a housing 70 of the power assist assembly 72 is illustrated. FIGS. 2 and 3 illustrate components of the housing 70 prior to complete assembly and FIG. 4 shows the housing 70 in an assembled condition. The housing 70 is formed of a composite material to reduce the overall weight and cost, compared to a metal housing, such as one formed with aluminum. In some embodiments, a polymer, such as polydicyclopentadiene (PDCPD) is employed to form the housing 70. In some embodiments, the entire housing 70 is formed of a common material. In other embodiments, certain portions of the housing 70 are formed of different materials. For example, the worm sleeve and gear bearing sleeve that are described below may be formed of a different material, relative to the rest of the housing 70. The portion(s) of the housing 70 that are not the worm sleeve and the gear bearing sleeve may be referred to herein as a "remainder" or "remainder portion" of the housing 70. This may include structural connector flanges or the like and other portions.

The housing 70 includes a worm sleeve 74 (FIG. 2) and a gear bearing sleeve 76 (FIG. 3). The worm sleeve 74 is configured to retain the worm 30 in a desired position and the gear bearing sleeve 76 is configured to retain the gear 28 in a desired position. Rather than casting a single overall component that contains these features and then machining the housing 70, the embodiments described herein are manufactured by separately forming the components and adding material, as needed, with an over-mold process. In particular, the worm sleeve 74 and the gear bearing sleeve 76 are independently formed and then joined with the rest of the housing 70, as described in detail herein.

Figure 6:
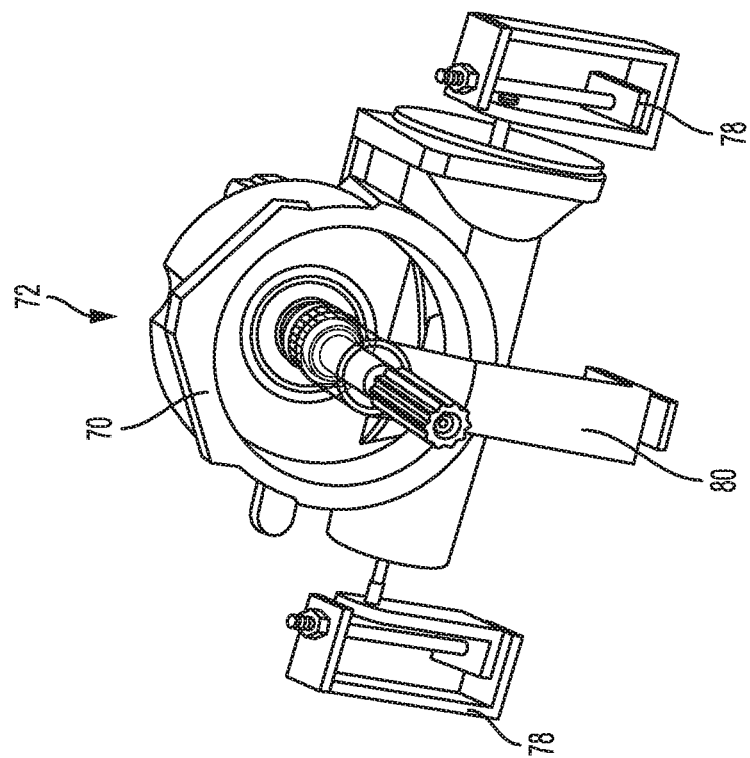
FIG. 6 is a perspective view of the power assist assembly.
Figure 5:
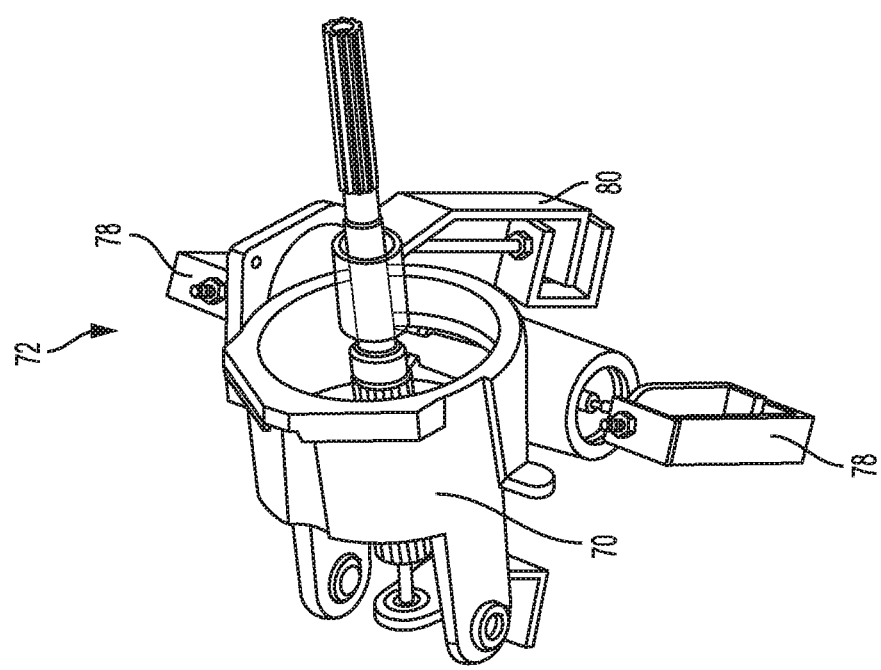
FIG. 5 is a perspective view of the power assist assembly.

Referring now to FIGS. 5 and 6, multiple support structures are shown and are employed to stabilize the worm sleeve 74 and the gear bearing sleeve 76 during assembly. In particular, one or more worm supports 78 are provided to support the worm sleeve 74 and one or more gear supports 80 are provided to support the gear bearing sleeve 76. These support structures 78, 80 allow for repositioning of the worm sleeve 74 and the gear bearing sleeve 76 to a desired overall orientation with the worm 30 and the gear 28 installed therein prior to final assembly. The relative positioning may be performed by adjusting the relative orientation of the worm bearing sleeve and the gear bearing sleeve to a desired position obtained by a theoretically calculated position while supported by the worm bearing sleeve support(s) and the gear bearing support(s). Additionally, friction testing may be performed, and the axis distance may be adjusted to the desired position. The relative orientation of the worm bearing sleeve and the gear bearing sleeve is obtained by adjustment of the worm bearing sleeve support and the gear bearing sleeve support to reach a defined worm and gear teeth mesh condition prior to over-molding the remainder of the housing. Subsequently, the remainder of the housing 70 may be over-molded thereon. Alternatively, mandrels may be employed, with the sleeves 74, 76 over-molded therein to obtain a net shape which can then follow standard assembly processes associated with an aluminum cast housing.

Manufacturing the sleeves 74, 76 in a separate step allows the use of reinforcement in only these areas, which are the most loaded, but utilizing a low volume and using cheaper material without reinforcement for the remainder of the housing body.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A housing for a steering column power assist assembly manufactured by the process comprising:
    forming a worm bearing sleeve;
    forming a gear bearing sleeve, the worm bearing sleeve and the gear bearing sleeve being independently manufactured and distinct components;
    maintaining separation of the worm bearing sleeve and the gear bearing sleeve; and
    over-molding a remainder of the housing onto the worm bearing sleeve and the gear bearing sleeve, the entire housing formed of a composite material, the over-molded portion of the housing solely responsible for joining the worm bearing sleeve and the gear bearing sleeve.

2. The housing of claim 1, further comprising supporting the worm bearing sleeve with at least one worm bearing sleeve support and supporting the gear bearing sleeve with at least one gear bearing sleeve support prior to over-molding the remainder of the housing.

3. The housing of claim 2, wherein the relative orientation of the worm bearing sleeve and the gear bearing sleeve is adjusted to a desired position obtained by a theoretically calculated position while supported by the worm bearing sleeve support(s) and the gear bearing support(s).

4. The housing of claim 2, wherein the relative orientation of the worm bearing sleeve and the gear bearing sleeve is obtained by adjustment of the worm bearing sleeve support and the gear bearing sleeve support to reach a defined worm and gear teeth mesh condition prior to over-molding the remainder of the housing.

5. The housing of claim 1, wherein the remainder of the housing is formed with a reaction injection molding process.

6. The housing of claim 1, wherein the remainder of the housing is over-molded on the worm bearing sleeve and the gear bearing sleeve when the worm bearing sleeve has a worm disposed therein and when the gear bearing sleeve has the gear disposed therein.

7. The housing of claim 1, wherein the remainder of the housing is over-molded on the worm bearing sleeve and the gear bearing sleeve when the worm bearing sleeve and the gear bearing sleeve are mounted on respective mandrels.

* * * * *